United States Patent [19]

Hughins

[11] Patent Number: 4,545,022

[45] Date of Patent: Oct. 1, 1985

[54] FRACTIONAL CALCULATOR

[76] Inventor: James T. Hughins, 4505 Cherryvale Ave., Soquel, Calif. 95073

[21] Appl. No.: 465,500

[22] Filed: Feb. 10, 1983

[51] Int. Cl.⁴ .......................... G06F 3/14; G06F 7/38
[52] U.S. Cl. ............................... 364/709; 235/145 R; 235/310; 364/710
[58] Field of Search ............ 235/145 R, 310; 377/13, 377/48, 49; 364/709, 710, 715, 716

[56] References Cited

U.S. PATENT DOCUMENTS

| | | | |
|---|---|---|---|
| 3,973,113 | 8/1976 | Goldsamt | 235/310 |
| 3,978,328 | 8/1976 | Fabry et al. | 364/709 |
| 4,064,398 | 12/1977 | Kishimoto et al. | 364/709 |
| 4,081,859 | 3/1978 | Goldsamt et al. | 364/709 |
| 4,481,598 | 11/1984 | Ishiwata | 364/709 |

*Primary Examiner*—John S. Heyman
*Attorney, Agent, or Firm*—Willis E. Higgins

[57] ABSTRACT

A fractional calculator (10) has a keyboard (12) with numeral keys (18) and denominator keys (20). Through use of the numeral keys (18) and the denominator keys (20), fractional inputs may be entered into the calculator and calculations carried out on the inputs through use of function keys (22). A decimal/U.S. toggle key (26) allows the calculator to be used in either a conventional decimal mode or a fractional mode. When the calculator is used in a fractional mode, key (30) is used to differentiate between integers and numerators of fractions entered by means of the numeral keys (18). Key (28) may be used to distinguish between feet and inches in mixed unit entries during fractional mode operation. Display (14) includes indicators (38, 39, 40, 42, 44) for different modes of operation and different types of entries.

10 Claims, 2 Drawing Figures

FRACTIONAL CALCULATOR

BACKGROUND OF THE INVENTION

1. Field of the Invention

This invention relates to a special purpose calculator. More particularly, it relates to such a calculator which is especially adapted for use by tradespeople and others who are required to do a substantial amount of calculation involving numbers expressed as fractions. Most especially, it relates to such a calculator which will also handle calculations involving numbers expressed in feet and inches.

2. Description of the Prior Art

Hand-held calculators have assumed a ubiquitous role in a wide variety of occupations. Special purpose calculators have been made available for scientific, financial and statistical calculations. It is also known to provide a calculator which will convert measurements expressed in one unit of measurement to a different unit of measurement, such as from inches to centimetres or inches to feet automatically. One such conversion calculator is describe in the publication entitled "MOS/LSI Data Book" (Santa Clara, California, National Semiconductor Corporation, 1977), pages 8-56-8-65.

In a substantial number of occupations, it is necessary to carry out calculations involving fractional numbers. Such calculations are common in the construction trades, in machining, and the garment trades. Despite the worldwide acceptance of metric measurements, most measurements of length in these and other trades in the United States continue to be made in inches and feet, with measurements less than one inch in length being expressed as fractions. When calculations involving such measurements are to be carried out using prior art calculators, it has been necessary to convert the fractions to decimals. Doing so adds another level of calculation, which is confusing to the user. As a result, a fairly high percentage of calculations involving measurements of length in inches and feet continue to be performed manually. If such calculations could be conveniently carried out with an electronic calculator, errors in these calculations would be reduced.

SUMMARY OF THE INVENTION

Accordingly, it is an object of this invention to provide a calculator which will handle calculations involving fractions, without requiring the user to convert the fractions to decimal form.

It is another object of the invention to provide a calculator which will allow direct entry of mixed numbers containing integers and fractions and calculations involving such mixed numbers.

It is a further object of the invention to provide a calculator which will allow input, calculation and output of numbers expressed in feet and inches.

It is still another object of the invention to provide such a calculator for numbers in feet and inches which will also handle fractions without requiring the user to convert the fractions to decimal form.

The attainment of these and related objects may be achieved through use of the novel calculator for fractions herein disclosed. The calculator of this invention includes a keyboard having a plurality of number keys and a plurality of denominator keys. There are a plurality of function keys for selecting operations to be performed on numbers and fractions selected by activation of the number keys and the denominator keys. Circuit means are operatively connected to the keyboard for carrying out the selected operations on the selected numbers and fractions.

In a preferred form of the invention, a selection key is provided for permitting the calculator to operate in conventional decimal fashion or to receive mixed unit inputs, for example, in feet and inches, to carry out calculations on the mixed unit inputs, and to express results in mixed unit form, all without requiring conversion by the user to a single unit of expression. In an especially preferred form, the calculator of this invention will handle inputs in mixed unit form with mixed numbers involving both integers and fractions, without requiring user conversions.

The attainment of the foregoing and related objects, advantages and features of the invention should be more readily apparent to those skilled in the art, after review of the following description of the invention, taken together with the drawings, in which:

DETAILED DESCRIPTION OF THE INVENTION

Figure 1:
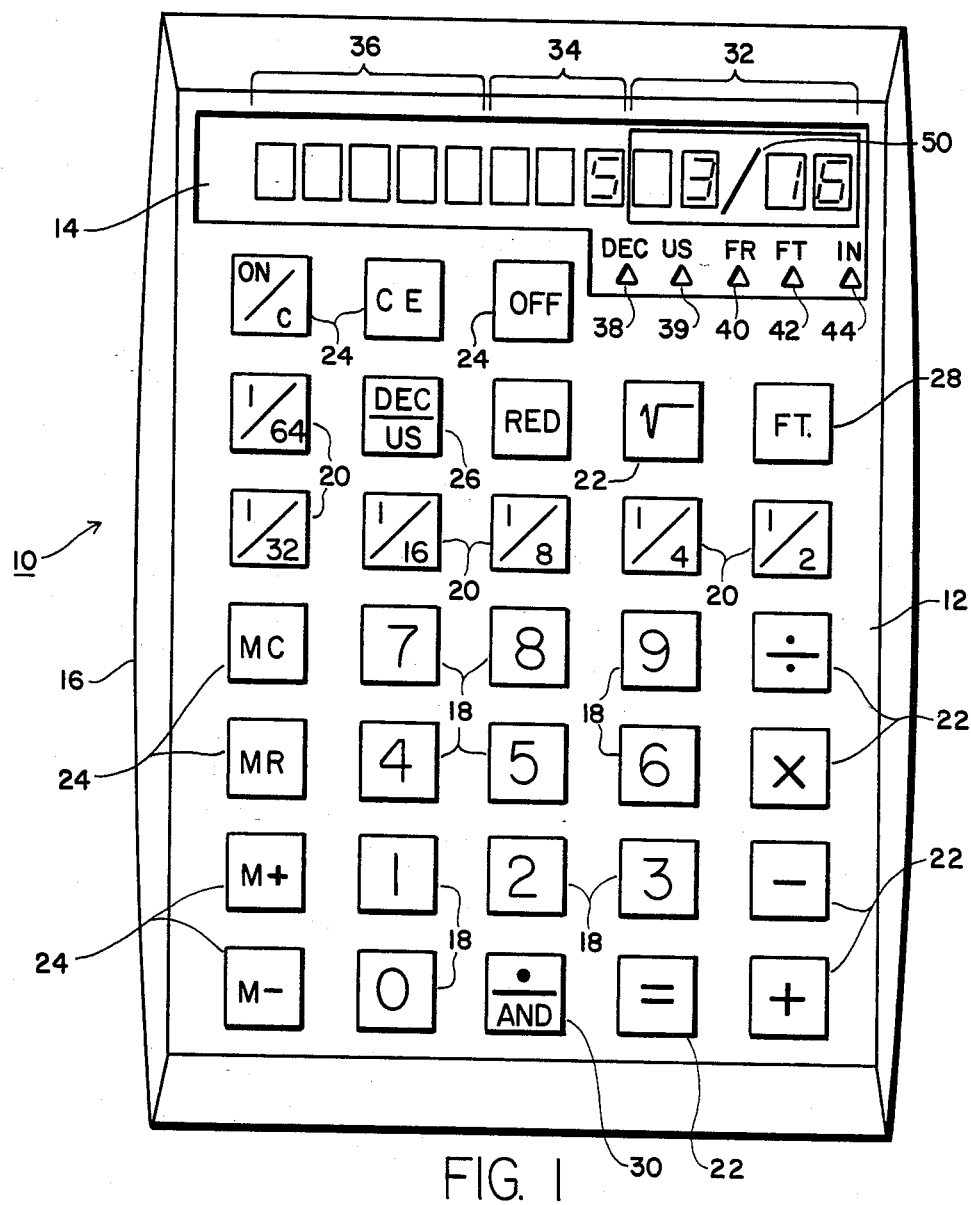
FIG. 1 is a plan view of a calculator incorporating the invention.

Turning now to the drawings, more particularly to FIG. 1, there is shown an external view of a calculator 10 in accordance with the invention. The calculator has a keyboard 12 and a display 14 mounted in case 16. The keyboard 12 includes a plurality of conventional numeral keys 18. For carrying out calculations involving fractional numbers, the keyboard 12 also includes a plurality of denominator keys 20. A plurality of conventional function keys 22 allow selection of computation operations to be carried out on numbers entered in the calculator 10 through use of the number keys 18 and the denominator keys 20. Control keys 24 are used to select other calculator operations in a conventional manner.

A decimal/U.S. measurement toggle key 26 allows the calculator 10 to operate either in a conventional mode to handle decimal numbers entered via number keys 18 or to allow direct entry, manipulation and display of measurements entered in feet and inches, using the number keys 18 and the denominator keys 20, as necessary. When the calculator 10 is operated in the mode allowing direct entry of measurements in feet and inches, feet/inches toggle key 28 is used to differentiate between the units in entry. Key 30 is used for decimal placement when key 26 is toggled for decimal operation, or to indicate partitioning between an integer and a fraction when key 26 is toggled to operation in U.S. units.

Display 14 of the calculator 10 is composed of conventional seven segment light emitting diode (LED) or liquid crystal (LC) digits. The first four digits 32 at the right hand side of the display 14 are for display of fractions. The next three digits 34 of the display are used for measurements entered in inches. When feet/inches toggle key 28 is employed the remaining five digits 36 of the display show entered, calculated or converted measurements in feet. When the calculator 10 is operating in the conventional decimal mode, the digits 34 and 36 are used together to provide an eight digit, floating point decimal display. Indicators 38, 39, 40, 42 and 44 respectively indicate the decimal mode of operation, U.S. units mode of operation, entry of a fraction, entry of a measurement in feet, and entry of a measurement in inches.

In operation of the calculator 10, when key 26 is toggled to decimal operation, denominator keys 20 and digits 32 of the display 14 are inactive, and indicator 38 is activated to show decimal operation. The calculator 10 operates in a conventional manner in this mode, which will not be explained further.

When key 26 is toggled to the U.S. units mode of operation, the denominator keys 20 are active, and key 30 is used to distinguish between entry of an integer and a fraction in mixed numbers. If the user does not employ the feet/inches toggle key 28 during the entry of numbers, numbers are entered as dimensionless integers and fractions with the number keys 18 and the denominator keys 20. In this case, digits 34 and 36 of the display function as in the conventional decimal operation, except that there is no decimal point.

The keyboard 10 also incorporates a reduction key 46. The reduction key enables an entered fraction to be expressed in the closest reduced form. For example, if it is desired to express 47/64 to the nearest quarter, 47/64 is entered, followed by depressing the reduction key and the "¼" denominator key 20. The fractional digits 32 then display the answer of ¾.

In a specific example, if it is desired to add 1 ⅞ to 3 5/16, key 26 is toggled to U.S. operation. Indicator 39 is activated to show selection of that mode. The "1" numeral key 18 is depressed, followed by the "and" key 30. The "1" entered is then shown in the digit position immediately to the left of the fraction digits 32 in display 14. Pressing the "and" key 30 indicates that the following entry is fractional. The "7" numeral key 18 is then pressed for entering the numerator of the fraction. The fraction digit 32 immediately to the left of the fraction symbol 50 displays the numerator. If two numeral keys 18 are pressed in succession after "and" key 30, the selected numbers are displayed in the two digits to the left of the fraction symbol 50. The denominator of the fraction is selected by pressing one of the denominator keys 20. The selected denominator is displayed in the two digits to the right of fraction symbol 50. In this case, the "⅛" denominator key 20 is depressed. In practice, the denominator keys 20 may be implemented by utilizing the largest denominator appearing on the keyboard, i.e., 64, then dividing down by appropriate factors to achieve the other fractions. To complete the example, "+" function key 22 is then depressed, followed by the "3" numeral key 18, the "and" key 30, "5" numeral key 18, the "1/16" fraction key 20 and the "=" function key 22. The answer, 5-3/16, is displayed in the first digit to the left of fractional display 32 and in fractional display 32.

In this example, the numbers were dimensionless. The calculator is also capable of handling operations involving mixed unit measurements in feet and inches, through use of the feet toggle key 28. For example, assume it is desired to add 8 ft. 9 ⅜" and 7 ft. 4 5/16". The "8" numeral key is depressed, followed by the feet toggle key 28. Depressing the key 28 enters the 8 as feet and also toggles the calculator 10 to accept the next entry as inches. The "9" numeral key 18 is depressed, followed by the "and" key 30, the "3" numeral key 18, the "⅛" denominator key 20, and the "+" function key 22. Should the next entry be in inches alone, key 28 is not depressed, and the calculator treats the entry as inches.

The other operand is entered in an analogous manner. The answer of 16 ft. 1 11/16" is shown in display 14 with the 16 displayed in feet digits 36, the 1 displayed in inches digits 34, and the 11/16 in fraction digits 32. The calculator automatically converts inches to feet in the required increments of 12. If the user wishes to have the answer expressed in inches alone, toggle key 28 is depressed to carry out the conversion. Pressing toggle key 28 again will convert the answer back to inches and feet. Calculations in inches alone are treated in the same manner as dimensionless numbers, but toggle key 28 will allow conversion of the answer to feet and inches.

Figure 2:
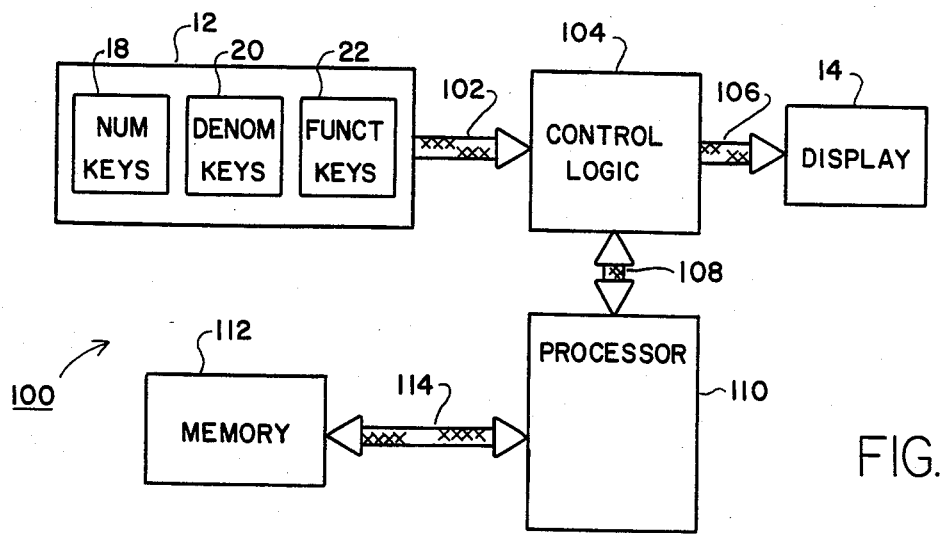
FIG. 2 is a block diagram of electronic circuits incorporated in the calculator of FIG. 1.

FIG. 2 shows circuits 100 incorporating the calculator 10 of FIG. 1. Keyboard 12, incorporating the numeral keys 18, the denominator keys 20, the function keys 22 and the other keys discussed above, is connected by cable 102 to control logic 104. Control logic 104 is connected by cable 106 to display 14. Control logic 104 is also connected by a bi-directional bus 108 to processor 110 to allow the flow of information in both directions between these units. Processor 110 carries out operations on data entered into the calculator by keyboard 12. Processor 110 is connected to memory 112 by a bi-directional bus 114, to allow information to be supplied to and withdrawn from the memory 112 in response to commands from the processor 110.

Control logic 104 typically includes a read only memory (ROM) which contains a control program for implementing the various functions of the calculator in a known manner. Processor 110 may also contain a ROM for storage of additional instructions. The control logic 104 includes at least sufficient registers for holding information to be shown on display 14 and various logic gates. Processor 110 includes similar registers for holding information to be operated on. Except as necessary to implement the special features described above with reference to FIG. 1, the construction and operation of the circuits shown in FIG. 2 are conventional. The circuits 100 may be implemented with commercially available integrated circuits, with the programs necessary for implementing the functions of the calculator 10 being provided in the ROMs.

It should now be readily apparent to those skilled in the art that a novel fractional calculator capable of achieving the stated objects of the invention has been provided. The calculator 10 allows fractions to be entered, calculations to be carried out, and results to be displayed in fractional form, without requiring user conversion to decimal form. The calculator 10 will handle mixed numbers consisting of integers and fractions, and will also handle mixed unit calculations involving measurements in feet and inches.

It should further be apparent to those skilled in the art that various changes in form and details of the invention as shown and described may be made. For example, a calculator in accordance with this invention can be provided for handling mixed unit calculations involving ounces and pounds, ounces, pints, quarts, and the like.

If desired, the decimal/U.S. toggle key 26 may be omitted, and the capability of calculating in decimals omitted. In this form, the calculator can handle operations in whole numbers and fractions only. In this embodiment, the mode indicators 38, 39, 40, 42 and 44 may also be omitted, since the mode of an entry will be indicated by its location in positions 32, 34, 04 36 of the display 14. It is intended that such changes be included within the spirit and scope of the claims appended hereto.

What is claimed is:

1. A calculator for fractions, which comprises a keyboard including a plurality of number keys, a plurality of denominator keys having a preselected range of numbers, a plurality of function keys for selecting operations to be performed on whole numbers and fractions selected by actuation of said number keys for the whole numbers followed by actuation of a numerator function key in combination with said number keys for the numerator of the fraction and then selecting one of said preselected denominator numbers from said denominator keys, a display for showing entry of the selected numbers and fractions and results of the selected operations, and circuit means operatively connected to said keyboard and said display for carrying out the selected operations on the selected numbers and fractions, and for displaying the selected numbers, the selected operation, and the results of the selected operation on said display.

2. The calculator for fractions of claim 1 in which said keyboard includes a selection key for choosing between decimal operation and fractional operation.

3. The calculator for fractions of claim 1 in which said keyboard includes a key for distinguishing entry of an integer and entry of a fraction.

4. The calculator of claim 1 in which said keyboard includes a key for reducing a fraction to the closest whole number numerator with a selected denominator.

5. The calculator of claim 1 in which said keyboard includes a key for selecting between mixed units for an entry.

6. The calculator of claim 1 in which said keyboard includes at least one key for selecting between different types of entries and said display includes an indicator for each different type of entry.

7. The calculator of claim 6 in which the different types of entries include integers and fractions.

8. The calculator of claim 7 in which the different types of entries include entries in feet and entries in inches.

9. The calculator of claim 6 in which said keyboard additionally includes at least one key for selecting between different modes of operation and said display includes an indicator for each different mode of operation.

10. The calculator of claim 9 in which the different modes of operation include decimal and fractional operation.

* * * * *